Figure 1:
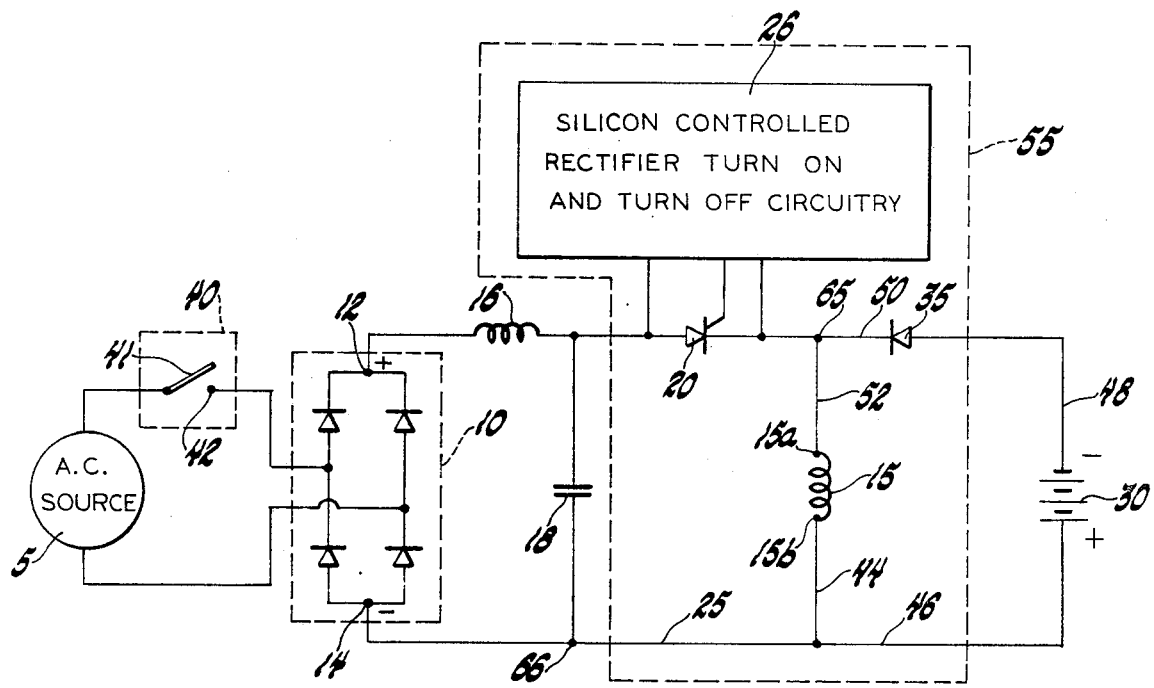

United States Patent [19]

Templin

[11] 4,236,107

[45] Nov. 25, 1980

[54] SECONDARY CELL CHARGING SYSTEM

[75] Inventor: Jackson R. Templin, Anderson, Ind.

[73] Assignee: General Motors Corporation, Detroit, Mich.

[21] Appl. No.: 963,091

[22] Filed: Nov. 22, 1978

[51] Int. Cl.³ .............................................. H02J 7/10
[52] U.S. Cl. ...................................... 320/21; 320/59
[58] Field of Search ....................... 320/21, 39, 57, 59, 320/3, 15

[56] References Cited

U.S. PATENT DOCUMENTS

| | | | |
|---|---|---|---|
| 3,602,794 | 8/1971 | Westhaver | 320/39 |
| 3,629,681 | 12/1971 | Gurwicz | 320/21 |
| 3,656,046 | 4/1972 | Parke | 320/59 |
| 3,775,659 | 11/1973 | Carlsen | 320/39 X |
| 3,808,481 | 4/1974 | Rippel | |
| 3,881,141 | 4/1975 | Narita | |

*Primary Examiner*—Robert J. Hickey
*Attorney, Agent, or Firm*—Richard G. Stahr

[57] ABSTRACT

The energizing circuit of an inductor connected across a supply potential source is periodically completed and interrupted at a selected rate. A secondary cell load to be charged is coupled to the inductor through a diode that is poled in such a manner that the secondary cell load is isolated thereby from the inductor energizing circuit during the periods that the energizing circuit is completed and the secondary cell load is charged through the diode by the charging current produced by the potential induced in the inductor upon each interruption of the inductor energizing circuit.

5 Claims, 4 Drawing Figures

SECONDARY CELL CHARGING SYSTEM

This invention is directed to a secondary cell charging system and, more specifically, to a secondary cell charging system capable of providing a charge potential of the level required to charge a secondary cell load when supplied by a supply potential source of a potential level within a range less than and greater than that of the required charge potential and, further, presents a reasonable power factor with a minimum line current distortion factor to an alternating current supply grid.

A "secondary cell" is a voltaic cell in which the electrochemical action is reversible so that the cell can be repeatedly charged, discharged and recharged. As is well known in the art, a storage battery may be a single secondary cell or a plurality of electrically interconnected secondary cells. In the modern automotive art, for example, the vehicle storage "battery" is six (6) secondary cells connected in series. In this specification, therefore, the term "storage battery" or "battery" includes both a unit comprised of one secondary cell and a unit comprised of two or more electrically interconnected secondary cells.

The anticipated future widespread use of storage battery powered electric vehicles may require that the vehicle batteries be recharged from residential alternating current power. As the total electric vehicle battery voltage may be substantially greater than that available from a residential alternating current power supply grid, the charging system should be capable of providing a charge potential of the level required to charge a storage battery load when supplied by a supply potential source of a potential level within a range less than and greater than that of the required charge potential. Furthermore, in the event a substantial number of electric vehicle batteries are to be recharged, it is important that the power drawn from the residential alternating current power supply grid by the battery chargers be controlled as to power factor and line current distortion factor. Therefore, a secondary cell charging system that is capable of supplying a charge potential of the level required to charge a secondary cell load from a supply potential source within a range less than and greater than that of the required charge potential and that presents a reasonable power factor with a minimum line current distortion factor to the alternating current supply grid is desirable.

It is, therefore, an object of this invention to provide an improved secondary cell charging system.

It is another object of this invention to provide an improved secondary cell charging system that is capable of providing a charge potential of the level required to charge a variety of storage battery loads when supplied by a supply potential source of a potential level within a range less than and greater than that of the required charge potential.

It is another object of this invention to provide an improved secondary cell charging system including an inductor energized by the rectified potential of a residential alternating current power supply grid through an input choke filter circuit included in the inductor energizing circuit that operates to maximize the power factor and to minimize the line current distortion factor in the alternating current supply grid.

In accordance with this invention, a secondary cell charging system is provided wherein a direct current energizing circuit for an inductor is periodically completed and interrupted at a selected rate and/or duty cycle and a secondary cell load is coupled to the inductor through a diode that is poled in such a manner that the secondary cell load is isolated from the inductor energizing circuit and is charged through the diode by the charging current produced by the potential induced in the inductor upon each interruption of the inductor energizing circuit.

Figure 2:
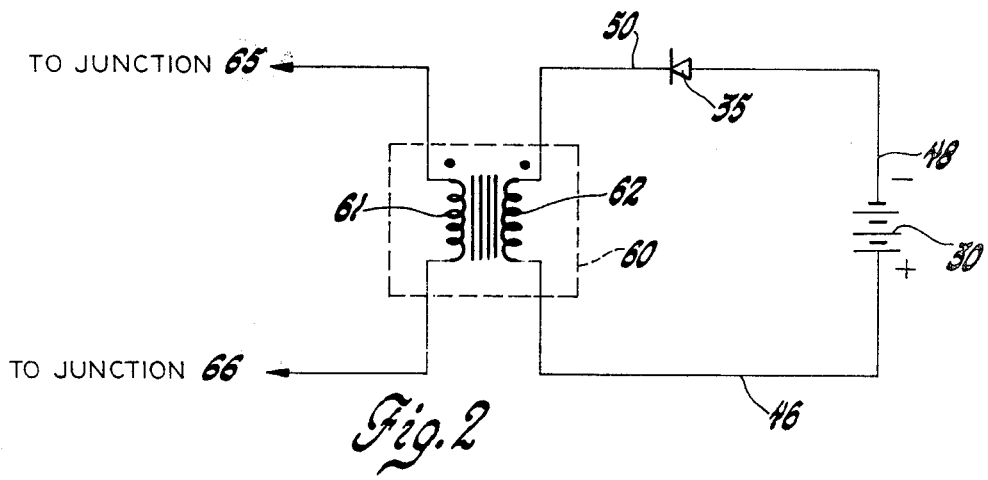
Figure 3:
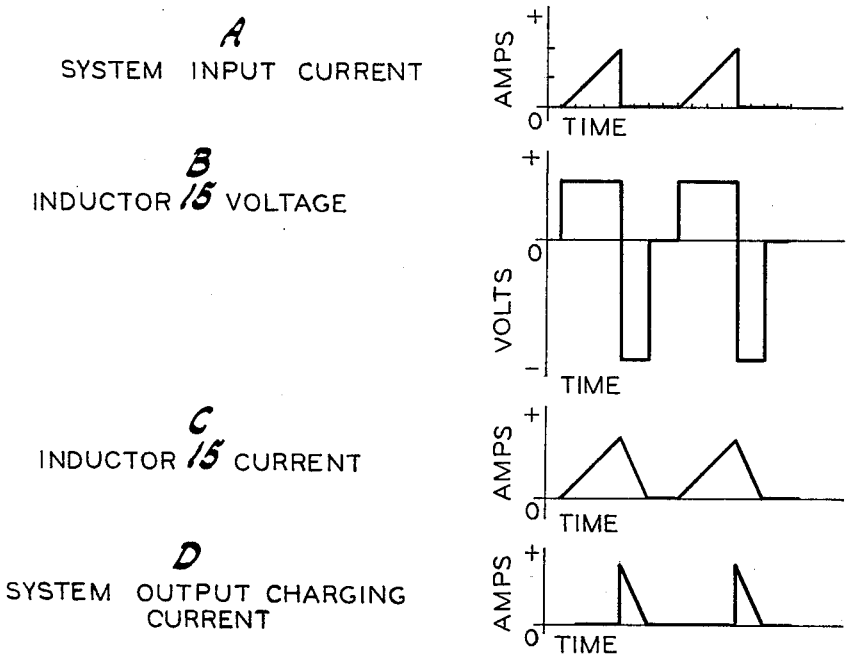
Figure 4:
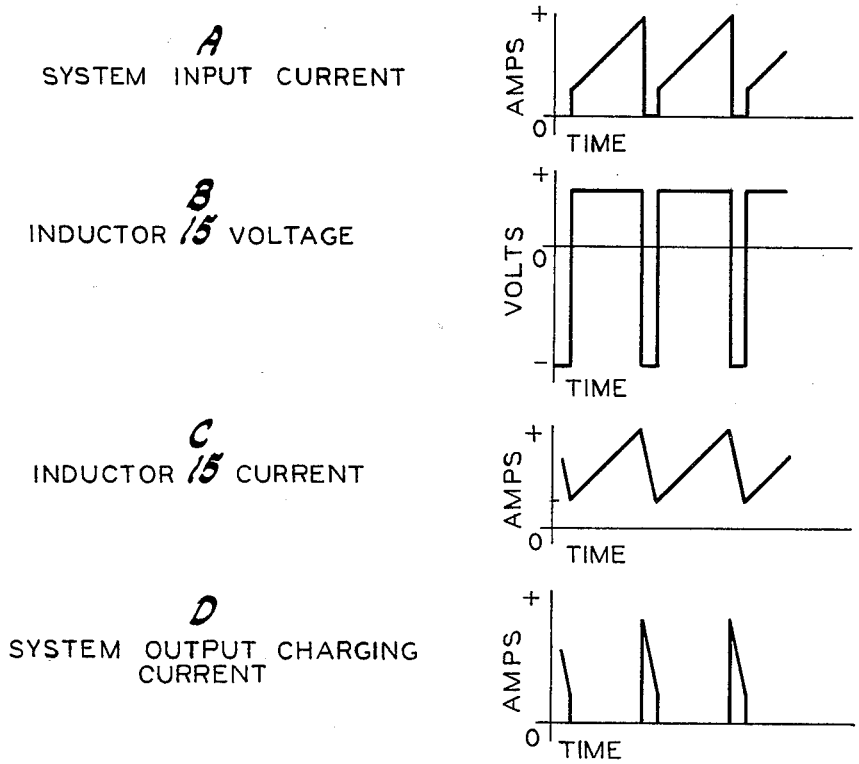

For a better understanding of the present invention, together with additional objects, advantages and features thereof, reference is made to the following description and accompanying drawing in which:

FIG. 1 sets forth the secondary cell charging system of this invention in schematic form;

FIG. 2 sets forth an alternate embodiment of the charging system of this invention in schematic form; and FIGS. 3 and 4 are curves useful in understanding the circuit of FIG. 1.

In FIG. 1 of the drawing, a residential alternating current supply grid is represented in block form and is referenced by the numeral 5. The alternating current potential supplied by the residential alternating current supply grid is full wave rectified by a conventional four diode, single phase full wave rectifier circuit 10 having positive and negative polarity output terminals 12 and 14, respectively. Although rectifier circuit 10 is illustrated in FIG. 1 as a single phase full wave rectifier circuit, it is to be specifically understood that any full wave rectifier circuit compatible with either single phase or polyphase alternating current supply systems may be employed without departing from the spirit of the invention.

An inductor 15 is connected across the positive polarity output terminal 12 and the negative polarity output terminal 14 of rectifier circuit 10 through a direct current energizing circuit that includes an input choke filter circuit comprising series inductor 16 and parallel capacitor 18, a switching device illustrated as a silicon controlled rectifier 20 and lead 25. Although the switching device is illustrated in FIG. 1 to be silicon controlled rectifier, it is to be specifically understood that alternate switching devices such as power transistors may be employed without departing from the spirit of the invention. The switching device is located in the portion of the inductor 15 energizing circuit through which energizing current is supplied to inductor 15 for periodically completing and interrupting this energizing circuit at a selected rate and/or duty cycle. This periodic completion and interruption should be at a rate of frequency that is as high as the switching device employed will permit. For example, with a silicon controlled rectifier switch, the periodic completion and interruption of the inductor 15 energizing circuit may be at a rate or frequency of 400 to 500 Hertz and with a CMOS power transistor switch, the periodic completion and interruption of the inductor 15 energizing circuit may be at a rate of frequency in excess of 100 kilohertz. The switching device employed may be controlled by conventional silicon controlled rectifier or power transistor "turn on" and "turn off" circuitry 26 of any type well known in the art. As this circuitry may be of any type well known in the art and, per se, forms no part of this invention, it is illustrated in FIG. 1 in block form. One example of a suitable circuit for effecting the "turn off" of switching silicon controlled rectifier 20 is shown and described in detail in U.S. Pat. No. 3,427,477 that issued Feb. 11, 1969 and is assigned to the same assignee as is this invention. One example of a suitable "turn on" and "turn off" circuit arrangement for providing the "turn on" and "turn off" signals for operating the switching device is a conventional bistable multivibrator circuit or a conventional monostable multivibrator circuit driven by a constant frequency oscillator.

For purposes of this specification and without intention or inference of a limitation thereto, the secondary cell load will be assumed to be a storage battery load that is represented in FIG. 1 by the accepted schematic symbol and referenced by the numeral 30.

Storage battery load 30 is coupled to inductor 15 through an output circuit including a diode 35. This diode is effective to isolate the output circuit from the previously described inductor 15 energizing circuit and to transmit a charge current to battery load 30 only upon the interruption of the inductor 15 energizing circuit to induce a potential in inductor 15 that rises to a level great enough to produce charge current flow through battery load 30.

Upon the connection of this charging system to an alternating current supply potential source 5 by the closure of movable contact 41 of switch 40 to stationary contact 42, capacitor 18 charges through inductor 16. Silicon controlled rectifier 20 is then operated conductive by silicon controlled rectifier "turn on" and "turn off" circuitry 26 to complete the inductor 15 energizing circuit. As a consequence, inductor 15 energizing current flows from capacitor 18 through the anode-cathode electrodes of conducting silicon controlled rectifier 20 and inductor 15 in a direction from terminal end 15a toward terminal end 15b. This current will not flow through battery load 30 because of the polarity of diode 35 and the polarity of battery load 30. When the inductor 15 energizing current has reached a desired value or after a suitable time has elapsed, silicon controlled rectifier "turn on" and "turn off" circuitry 26 operates silicon controlled rectifier 20 not conductive. Upon the turn off of silicon controlled rectifier 20, the inductor 15 energizing circuit is interrupted and the resulting collapsing magnetic field induces a potential in inductor 15. According to Lenz' Law, "An induced emf always has such a direction as to oppose the action that produces it". That is, when the current in a circuit is increasing, the induced emf opposes the applied voltage and tends to keep the current from increasing; and when the current is decreasing, the induced emf aids the line voltage and tends to keep the current from decreasing. As a consequence, the potential induced in inductor 15 attempts to maintain current flow in the same direction through its winding from terminal end 15a toward terminal end 15b. This induced potential, therefore, rises to a level great enough to produce a charging current through battery load 30 through a charging circuit that may be traced from terminal end 15b of inductor 15, through leads 44 and 46, battery load 30, lead 48, diode 35 and leads 50 and 52 to terminal end 15a of inductor 15. As will be brought out later in this specification, this charge current may go to zero. After a suitable time has elapsed, silicon controlled rectifier 20 is again operated conductive to complete the previously described inductor 15 energizing circuit. This periodic completion and interruption of the inductor 15 energizing circuit is repeated at a selected frequency and/or duty cycle as determined by the requirements of battery load 30. With this arrangement, the charging system of this invention will deliver a specific pulse of energy or charging current to battery load 30 for each cycle described above regardless of the battery terminal voltage due to the inductive kickback effect of inductor 15 when the energizing circuit therefor is interrupted. Furthermore, the potential induced in inductor 15 upon the interruption of its energizing circuit is independent of the magnitude of the supply potential for the reason that, regardless of the magnitude of the supply potential, the potential induced in inductor 15 will rise in accordance with Lenz' Law to a level sufficient to maintain current flow therethrough in the same direction as was the energizing current flow.

FIGS. 3A through 3D set forth curves that illustrate the relationship between system input current, inductor 15 voltage, inductor 15 current and system output charging current, respectively, for the charging system of this invention as illustrated in FIG. 1 when energized by a supply voltage of a magnitude equal to one half that of the battery load 30 voltage and operated in such a manner that switching silicon controlled rectifier 20 is cyclically operated conductive and not conductive at a rate or frequency low enough that inductor 15 current is discontinuous. As shown in respective FIGS. 3A, 3B, 3C and 3D, while the operation of switching silicon controlled rectifier 20 is operated conductive, the system input current increases in a positive direction from zero, the inductor 15 voltage is substantially equal to supply voltage and inductor 15 energizing current increases in a positive direction from zero. Upon each operation of switching silicon controlled rectifier 20 not conductive, system input current falls to zero, inductor 15 voltage reverses in polarity to a value equal to minus battery load 30 voltage, inductor 15 current begins to decrease toward zero and, as shown by FIG. 3D, a pulse of system output charging current is supplied to battery load 30 during the period of time required for inductor 15 current to fall to substantially zero. When the inductor 15 current has fallen to substantially zero, the inductor 15 voltage also goes to zero and the system is conditioned for the next operation of switching silicon controlled rectifier 20 conductive. As a consequence, while switching silicon controlled rectifier 20 is cyclically operated conductive and not conductive, a series of system output charging current pulses is supplied to battery load 30 at a rate or duty cycle that is a function of the rate or frequency at which switching silicon controlled rectifier 20 is operated conductive and not conductive.

FIGS. 4A through 4D set forth curves that illustrate the relationship between system input current, inductor 15 voltage, inductor 15 current and system output charging current, respectively, for the charging system of this invention as illustrated in FIG. 1 when energized by a supply voltage of a magnitude equal to one half that of the battery load 30 voltage and operated in such a manner that switching silicon controlled rectifier 20 is cyclically operated conductive and not conductive at a rate or frequency high enough that inductor 15 current is continuous. As shown in respective FIGS. 4A, 4B, 4C and 4D, upon the operation of switching silicon controlled rectifier 20 conductive, the system input current abruptly increases to a value equal to inductor 15 current and increases further in a positive direction from this value while switching silicon controlled rectifier 20 is conductive, inductor 15 voltage is substantially equal to supply voltage and inductor 15 energizing current increases in a positive direction from a lower value greater than zero. Upon each operation of switching silicon controlled rectifier 20 not conductive, system input current falls to zero, inductor 15 voltage reverses in polarity to a value equal to minus battery load 30 voltage, inductor 15 current begins to decrease toward zero and, as shown in FIG. 4D, a pulse of system output charging current is supplied to battery load 30 until switching silicon controlled rectifier 20 is again operated conductive. As a consequence, while switching silicon controlled rectifier 20 is cyclically operated conductive and not conductive, a series of system output charging current pulses is supplied to battery load 30 at a rate or duty cycle that is a function of the rate or frequency at which switching silicon controlled rectifier 20 is operated conductive and not conductive.

If desirable, the charging system of this invention may include two or more duplicates of the circuitry included within dashed line rectangle 55 of FIG. 1. With two or more duplicates of this circuitry, an overlap of the energization of respective inductors may be obtained. Therefore, through the use of plural duplicates of the circuitry set forth within dashed line rectangle 55, a continuous system input current, a continuous battery load charge current or simultaneous continuous system input current and battery load charge current may be obtained.

An alternate embodiment of the storage battery charging system of this invention is partially set forth in schematic form in FIG. 2 wherein like circuit elements have been assigned like characters of reference and wherein inductor 15 is replaced by a transformer 60 having a primary winding 61 and a secondary winding 62. The terminal ends of primary winding 61 are connected to respective junctions 65 and 66 of FIG. 1. This circuit operates in a manner identical to that described with respect to FIG. 1 except that the energy transfer between primary winding 61 and secondary winding 62 of transformer 60 is achieved through transformer action in a manner well known in the art. It is necessary, however, that the primary winding 61 and secondary winding 62 be poled as indicated in FIG. 2 by the accepted coil polarity marking. The embodiment of FIG. 2 has the advantage of electrical isolation of the battery load 30 from the residential alternating current power supply grid 5.

A particular advantage of the concept hereinabove described is that the circuitry including the switching devices and the inductor may be the same as that employed in the power conversion circuitry of an electric vehicle. Therefore, the same power handling components may be employed for both the vehicle operation function and the storage battery load charging function by appropriate electrical reconnections of circuits that may be achieved with a switch or a relay in a manner well known in the art.

The choke input filter comprising inductor 16 and capacitor 18 essentially tends to draw a constant DC current at constant output load. As a consequence, the input signal wave form supplied by residential alternating current power supply grid 5 to full wave rectifier circuit 10 approaches that of a square wave. With pure sign wave current, the line heating effect is equal to the product of the average current multiplied by 1.11, known as a form factor, and with substantially square wave current, the line heating effect is equal to the product of the average current multiplied by 1.0. As a consequence, the choke input filter operates to reduce line heating and the value of the form factor which, as a consequence, reduces the instances of unnecessary opening of the supply circuit protective devices.

Briefly, in the secondary cell charging system of this invention, the energizing circuit through which an inductor may be connected across a supply potential source is periodically completed and interrupted at a selected rate by a switching device located in the energizing circuit whereby the potential induced in the inductor upon each energizing circuit interruption rises to a value great enough to supply charge current to a secondary cell load to be charged that is coupled to the inductor through an output circuit that is isolated from the inductor energizing circuit while it is connected across the supply potential source and permits charge current to flow to the secondary cell load upon each interruption of the inductor energizing circuit. This is accomplished through the use of an inductive type energy storage device such as an inductor or a transformer. With the inductor, the energy is stored in the windings thereof and is transferred directly to the secondary cell load. With the transformer, the energy is stored in the primary winding and is transferred to the secondary cell load through the secondary winding.

While a preferred embodiment of the present invention has been shown and described, it will be obvious to those skilled in the art that various modifications and substitutions may be made without departing from the spirit of the invention that is to be limited only within the scope of the appended claims.

The embodiments of the invention in which an exclusive property or privilege is claimed are defined as follows:

1. A secondary cell charging system capable of providing a charge potential of the level required to charge a secondary cell load when supplied by a supply potential source of a potential level within a range less than and greater than that of the required charge potential comprising:
    an inductor,
    an energizing circuit through which said inductor may be electrically connected across said supply potential source;
    switching means located in a portion of said energizing circuit through which current is supplied to said inductor for periodically completing and interrupting said energizing circuit at a selected rate; and
    output circuit means coupling said inductor to said secondary cell load including a diode poled to isolate said output circuit means from said energizing circuit and to transmit a charge current to said secondary cell load only upon the interruption of said energizing circuit to induce a potential in said inductor that rises to a value great enough to supply charge current to said secondary cell load.

2. A secondary cell charging system capable of providing a charge potential of the level required to charge a secondary cell load when supplied by a supply potential source of a potential level within a range less than and greater than that of the required charge potential comprising:
    a first inductor,
    an energizing circuit including a second series inductor and a parallel capacitor through which said inductor may be electrically connected across said supply potential source;
    switching means located in a portion of said energizing circuit through which current is supplied to said inductor for periodically completing and interrupting said energizing circuit at a selected rate; and output circuit means coupling said inductor to said secondary cell load including a diode poled to isolate said output circuit means from said energizing circuit and to transmit a charge current to said secondary cell load upon the interruption of said energizing circuit to induce a potential in said inductor that rises to a value great enough to supply charge current to said secondary cell load.

3. A secondary cell charging system capable of providing a charge potential of the level required to charge a secondary cell load when supplied by a supply potential source of a potential level within a range less than and greater than that of the required charge potential comprising:

an inductive type energy storage arrangement;

an energizing circuit through which said inductive type energy storage arrangement may be electrically connected across said supply potential source;

switching means located in a portion of said energizing circuit through which current is supplied to said inductive type energy storage arrangement for periodically completing and interrupting said energizing circuit at a selected rate; and output circuit means coupling said inductive type energy storage arrangement to said secondary cell load including a diode poled to isolate said output circuit means from said energizing circuit and to transmit a charge current to said secondary cell load only upon the interruption of said energizing circuit whereby said inductive type energy storage arrangement produces an output potential that rises to a value great enough to supply charge current flow to said secondary cell load.

4. A secondary cell charging system capable of providing a charge potential of the level required to charge a secondary cell load when supplied by a supply potential source of a potential level within a range less than and greater than that of the required charge potential comprising:

an inductive type energy storage arrangement;

an energizing circuit including a series inductor and a parallel capacitor through which said inductive type energy storage arrangement may be electrically connected across said supply potential source;

switching means located in a portion of said energizing circuit through which current is supplied to said inductive type energy storage arrangement for periodically completing and interrupting said energizing circuit at a selected rate; and output circuit means coupling said inductive type energy storage arrangement to said secondary cell load including a diode poled to isolate said output circuit means from said energizing circuit and to transmit a charge current to said secondary cell load only upon the interruption of said energizing circuit whereby said inductive type energy storage arrangement produces an output potential that rises to a value great enough to supply charge current to said secondary cell load.

5. A secondary cell charging system capable of providing a charge potential of the level required to charge a secondary cell load when supplied by a supply potential source of a potential level within a range less than and greater than that of the required charge potential comprising:

a plurality of inductors, an energizing circuit for each said inductor through which said inductor may be electrically connected across said supply potential source;

a switch means located in each of said energizing circuits for periodically completing and interrupting the said energizing circuit in which it is located at a selected rate; and output circuit means coupling said inductors to said secondary cell load including a diode poled to isolate said output circuit means from each said energizing circuit and to transmit a charge current to said secondary cell load only upon the interruption of one of said energizing circuits to induce in the energized inductor a potential that rises to a value great enough to supply charge current to said secondary cell load.

* * * * *

UNITED STATES PATENT AND TRADEMARK OFFICE
CERTIFICATE OF CORRECTION

PATENT NO. : 4,236,107
DATED : November 25, 1980
INVENTOR(S) : Jackson R. Templin It is certified that error appears in the above—identified patent and that said Letters Patent is hereby corrected as shown below:

Column 2, line 50, "of" should read -- or --.

Column 2, line 58, after "rate", "of" should read -- or --.

Column 7, line 7, after "load" insert -- only --.

Signed and Sealed this

Seventh Day of April 1981

[SEAL]

Attest:

RENE D. TEGTMEYER

Attesting Officer    Acting Commissioner of Patents and Trademarks